Sept. 7, 1926.　　　　　　　　　　　　　1,599,025
S. A. MAGNUSON
GAUGE
Filed June 25, 1925　　　2 Sheets-Sheet 1
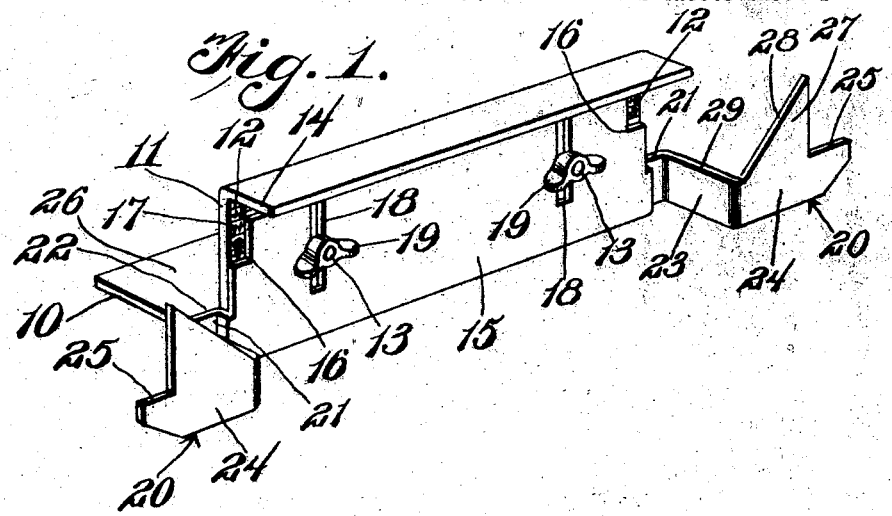
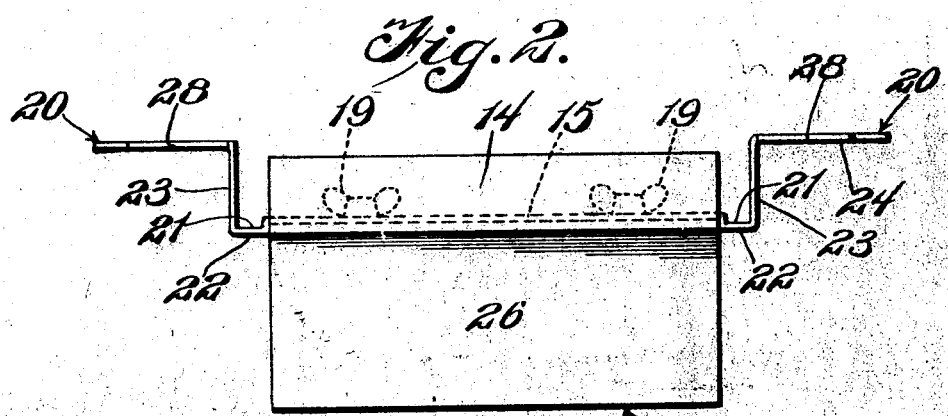
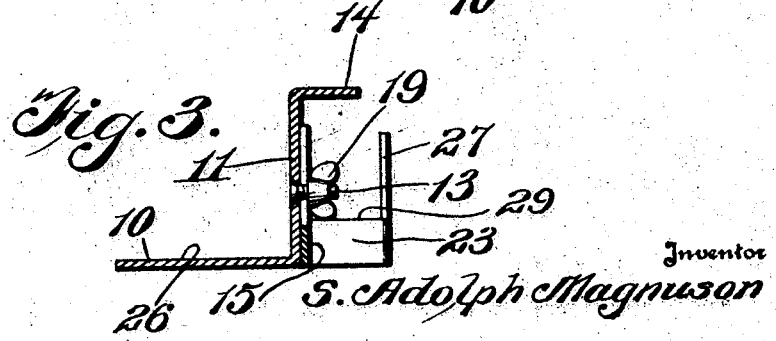
Inventor
S. Adolph Magnuson
By Watson E. Coleman
Attorney Sept. 7, 1926.
S. A. MAGNUSON
1,599,025
GAUGE
Filed June 25, 1925    2 Sheets-Sheet 2
Fig. 4.
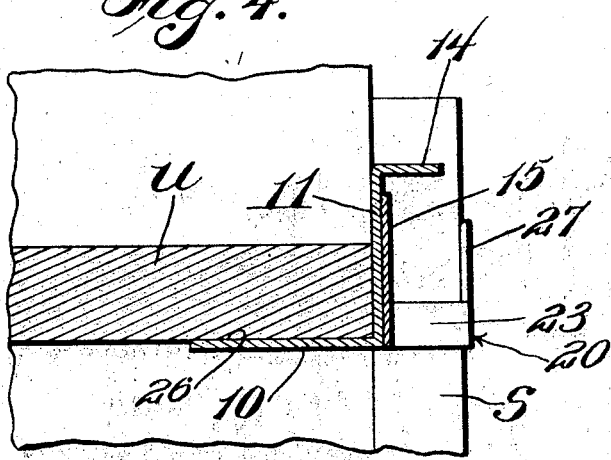
Fig. 5.
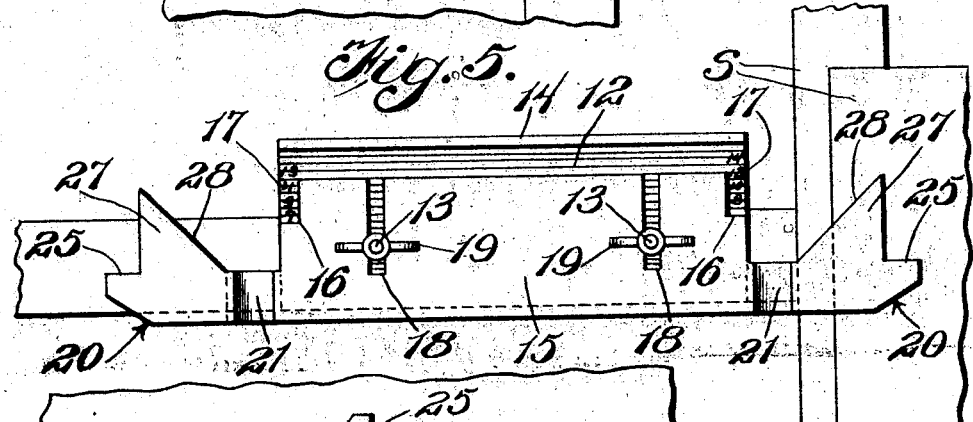
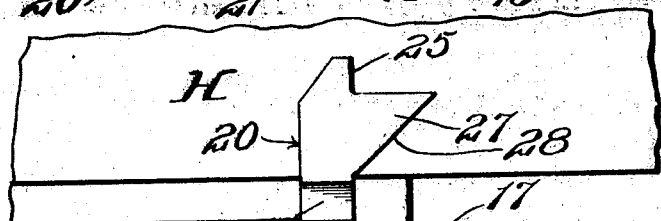
Fig. 6.
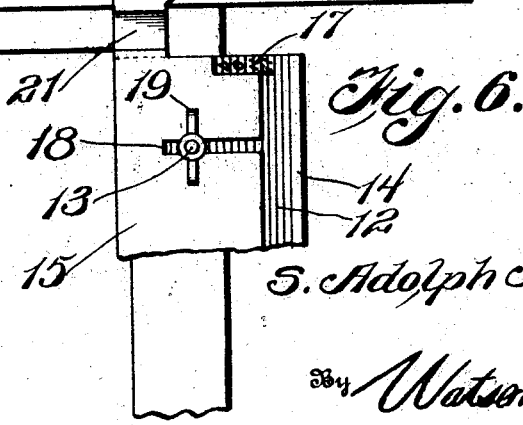
Inventor
S. Adolph Magnuson
By Watson E. Coleman
Attorney Patented Sept. 7, 1926.

1,599,025

UNITED STATES PATENT OFFICE.

SWAN ADOLPH MAGNUSON, OF LEONARD, NORTH DAKOTA.

GAUGE.

Application filed June 25, 1925. Serial No. 39,537.

This invention relates to gauges and more particularly to a gauge for use in sizing and placing the casings of doors or windows and forms a continuation in part of my former application, Serial No. 5602, filed January 29, 1925, for gauges.

An important object of the invention is to provide a device of this character which is adjustable so that it may be employed either for gauging casings to determine the proper length thereof, whether these casings are to be applied to a door or window upon which they are flush with the jambs or to a door or window where they are set back from the jambs to provide a margin.

A further object of the invention is to provide a device of this character which, in addition to marking the casing to indicate the proper length thereof, may also be employed for marking the casing to square or bevel one edge of the casing.

A still further object of the invention is to provide a device of this character which is capable of use for gauging margins for the casings where such margins are to be employed.

These and other objects I attain by the construction shown in the accompanying drawings, wherein for the purpose of illustration is shown a preferred embodiment of my invention and wherein:—

Figure 1 is a perspective view of a casing gauge constructed in accordance with my invention;

Figure 2 is a bottom plan view thereof;

Figure 3 is a vertical sectional view therethrough;

Figure 4 is a vertical sectional view showing the gauge applied to determine the length of a side casing;

Figure 5 is a front elevation of the gauge as put to this use; and

Figure 6 is a fragmentary front elevation showing the gauge in the position in which it is employed for gauging a margin for a side casing or for marking a bevel at the end of a head casing;

Referring now more particularly to the drawings, the gauge comprises what may be termed a jamb plate 10 having at one edge thereof a right angle flange 11 forming a gauge plate. The outer face of this gauge plate has marked thereon parallel indicating lines 12, the purpose of which will presently appear. Projecting outwardly from this plate at spaced points are a pair of threaded elements 13, the purpose of which will presently appear. The upper edge of this gauge plate has preferably projecting outwardly therefrom a right angular flange 14 so that the plate 10, gauge plate 11 and flange 14 combine to form a substantially Z-shaped structure.

The gauging element proper comprises a body 15 of the same length as the gauge plate and having the upper portion of its end edges notched, as at 16, so that when it is applied to the gauge plate, the gauge lines 12 thereof are exposed to view at this notch. At this point, these gauge lines may be provided with suitable indicia 17. The gauge is formed with transversely extending slots 18 opening through one side edge thereof and through which the threaded elements 13 extend and is held in adjusted position upon the gauge plate by means of thumb screws 19 of sufficient size to engage at the sides of the slot.

Extending outwardly from the ends of the gauge are a pair of gauge arms, generally indicated at 20, each arm being provided adjacent the gauge with a section 21 offset with relation to the gauge so that its rear surface 22 lies in the same plane as the rear surface of the gauge plate 11. At the outer end of this offset portion 21, each arm is directed forwardly at right angles to the offset portion, as indicated at 23, for a distance substantially equal to the usual thickness of the casings employed. At their forward ends, the portions 23 are provided with outwardly directed sections 24 which will overlie the face of a casing, an edge of which is abutted by the sections 23. The indicia of the gauge lines indicate the distance between the upper edge 25 of the arms 20 and the upper surface 26 of the jamb plate 10. The upper or gauging edge 25 of the arms 20 have projecting outwardly therefrom lugs 27, the lug of each arm having an edge 28 at an angle of 45° to the edge 25 of the arm and connecting with the edge 25 of the arm in alignment with the outer face 29 of the portions 23.

In the use of the device, where a margin is to be provided for the casings, the gauge is set to the proper margin. The side casings S are then seated upon the casing of the window or upon the floor, as the case may be, and the upper surface of the gauge plate brought into engagement with the lower surface of the upper jamb U of the frame with the forwardly extending portions 23 of one of the gauge arms in contact with the side of the casing and with the rear face of the gauge plate confronting the side edge of the upper jamb U. Then with a pencil or scriber, the edge and adjacent portions of the face of the side casings S are marked. It will be obvious that if a rosette is to be provided at the junction of the side casing S and head casing H and for this reason the casings must be squared off in alignment with the margin, this may be accomplished by placing the gauge against the proper jamb and utilizing the edge 25 of the arm to provide the necesary indication of the point of cut. By using the corresponding portion of the arm 23, a squaring cut indication may likewise be provided. Where the casings are merely to be brought together at an angle of 45°, the gauge is applied to one jamb while the casing corresponding to the other jamb, is being gauged, as shown in Figure 6, that is to say, if the head casing H is to be gauged, the gauge is placed against the side jamb so that an arm 20 thereof overlies the head casing at which time by marking along the edge 28, the bevel cut is indicated. The edge of the portion 23 may be used in this operation to provide the squaring cut indication in the manner above described. The casings are then removed for cutting and while removed, the gauge is employed to mark the margins upon the edges of the jambs. In doing this, the rear face of the gauge plate 11 is brought into engagement with the edge of the jamb while the upper face 26 of the jamb plate is engaged with the side face of the jamb. A pencil or other marking implement is then inserted at the conjunction of the arms 20 and more particularly the upper edge of one of these arms with the gauge 15 and the entire device shifted bodily along the jamb, the pencil held in this position marking the jamb throughout its length or, if desired, marking the jamb at spaced points along its length to provide a guide line to which the casing may be set.

It will be obvious that a device of this character is capable of a considerable range of change and modification without departing from the spirit of my invention and I accordingly do not limit myself to such specific structure except as hereinafter claimed.

I claim:—

1. A casing gauge for use in casing windows, doors and the like comprising a plate one face of which is adapted to flatly abut the face of a jamb and having a flange adapted to flatly abut the edge of the jamb and a gauge plate transversely adjustable upon the flange having an arm projecting beyond one end edge of the flange, means for securing the gauge plate in adjusted positions upon the flange, said arm having an edge thereof parallel to the jamb engaging face of the plate.

2. A casing gauge for use in casing windows, doors and the like comprising a plate one face of which is adapted to flatly abut the face of a jamb and having a flange adapted to flatly abut the edge of the jamb and a gauge plate transversely adjustable upon the flange having an arm projecting beyond one end edge of the flange, means for securing the gauge plate in adjusted positions upon the flange, said arm having an edge thereof parallel to the jamb engaging face of the plate, the extremity of said arm being offset from the jamb engaging face of the flange a distance equal to the thickness of the casing to be gauged.

3. A casing gauge for use in casing windows, doors and the like comprising a plate one face of which is adapted to flatly abut the edge of the jamb and a gauge plate transversely adjustable upon the flange having an arm projecting beyond one end edge of the flange, means for securing the gauge plate in adjusted positions upon the flange, said arm having an edge thereof parallel to the jamb engaging face of the plate, the extremity of said arm being offset from the jamb engaging face of the flange a distance equal to the thickness of the casing to be gauged, that portion of the arm next adjacent the gauge plate having its inner face parallel to and forming a continuation of the inner face of the flange, and connected to said extremity by a portion at right agles to the extremity and adapted to abut the side edge of the casing to be gauged.

4. A casing gauge for use in casing windows, doors and the like comprising a plate one face of which is adapted to flatly abut the face of a jamb and having a flange adapted to flatly abut the edge of the jamb, a gauge plate transversely adjustable upon the flange having an arm projecting beyond one end edge of the flange, means for securing the gauge plate in adjusted positions upon the flange, said arm having an edge thereof parallel to the jamb engaging face of the plate, said flange having indicia coacting with said gauge plate to determine the spacing between said edge of the arm and the jamb engaging face of said plate.

5. A casing gauge comprising a plate having a flange at one side edge thereof and disposed at right angles to the plate, a gauge plate abutting the outer face of the flange and having slots extending transversely thereof, the flange having threaded elements directed through said slots and nuts upon said threaded elements for engaging and holding the gauge plate in adjusted positions, the end edges of the gauge plate having projecting outwardly therefrom arms portions of the edges of which are parallel to the inner face of the plate.

6. A casing gauge comprising a plate having a flange at one side edge thereof and disposed at right angles to the plate, a gauge plate abutting the outer face of the flange and having slots extending transversely thereof, the flange plate having threaded elements directed through said slots and nuts upon said threaded elements for engaging and holding the gauge plate in adjusted positions, the end edges of the gauge plate having projecting outwardly therefrom arms portions of the edges of which are parallel to the inner face of the plate, the inner ends of said arms lying in the same plane as the inner face of the flange, the outer ends thereof being offset from the inner face of the flange a distance equal to the thickness of the casing to be gauged.

7. A casing gauge for use in casing windows, doors and the like comprising a plate one face of which is adapted to flatly abut the face of a jamb and having a flange adapted to flatly abut the edge of the jamb and a gauge plate transversely adjustable upon the flange having an arm projecting beyond one end edge of the flange, means for securing the gauge plate in adjusted positions upon the flange, said arm having an edge thereof parallel to the jamb engaging face of the plate, said edge of the arm having an outstanding lug an edge of which is at an angle of 45° to said edge of the arm.

8. A casing gauge for use in casing windows, doors and the like comprising a plate one face of which is adapted to flatly abut the face of a jamb and having a flange adapted to flatly abut the edge of the jamb and a gauge plate transversely adjustable upon the flange having an arm projecting beyond one end edge of the flange, means for securing the gauge plate in adjusted positions upon the flange, said arm having an edge thereof parallel to the jamb engaging face of the plate, the extremity of said arm being offset from the jamb engaging face of the flange a distance equal to the thickness of the casing to be gauged, that portion of the arm next adjacent the gauge plate having its inner face parallel to and forming a continuation of the inner face of the flange, and connected to said extremity by a portion at right angles to the extremity and adapted to abut the side edge of the casing to be gauged, said arm having upon said edge a lug an edge of which is at 45° to said edge of the arm and joins with said arm in alignment with the outer face of said right angular portion.

9. A casing gauge for use in casing windows, doors and the like comprising a plate adapted to abut the face of a jamb and having a flange adapted to abut the edge of the jamb, a gauge plate adjustable upon the flange having an arm projecting to one side of the flange, means for securing the gauge plate in adjusted positions upon the flange, said arm having a portion of an edge thereof parallel to the jamb engaging face of the plate and a second portion of said edge at 45° to the jamb engaging face of the plate.

In testimony whereof I hereunto affix my signature.

SWAN ADOLPH MAGNUSON.